Sept. 19, 1939.     H. GIBELLO     2,173,781
FABRIC FOR MASKS AND PROTECTIVE CLOTHING
Filed June 2, 1937
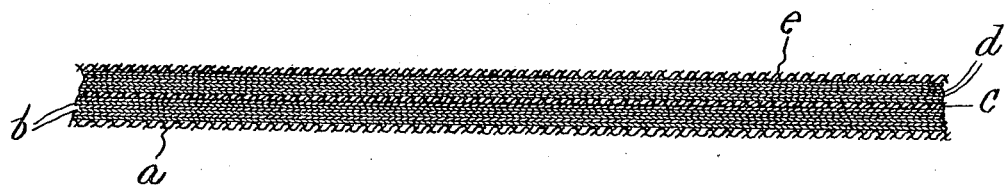
Inventor
Henri Gibello
By Wilkinson & Mawhinney
Attorneys.

Patented Sept. 19, 1939

2,173,781

UNITED STATES PATENT OFFICE 2,173,781

FABRIC FOR MASKS AND PROTECTIVE CLOTHING

Henri Gibello, Paris, France, assignor to Societe Nobel Francaise, Paris, Seine, France Application June 2, 1937, Serial No. 146,108
In France June 8, 1936

7 Claims. (Cl. 154—46)

The present invention relates to a manufacturing process for composite fabrics intended for use in making masks and protective clothing which are impermeable to liquids, aerosols and gases and to the fabrics prepared according to the process.

The ordinary fabrics of this nature have been prepared by coating or impregnating a fabric with a drying oil or a rubber solution in a suitable solvent. Fabrics prepared in this manner have several disadvantages:

Oiled fabrics have a disagreeable odor and their impermeability is low at low temperatures; They dry very slowly and their manufacture is a delicate process; Oiled cloths are very difficult to preserve over a period of time. Rubberized fabrics likewise lose their property of impermeability at low temperatures. Furthermore, they age very rapidly in the presence of oxygen or at high temperatures. Fabrics of this nature have also been prepared by coating a cloth with a solution of a polyvinyl ester and also by placing a layer of such an ester between two pieces of fabric. These polyvinyl esters have much better resistance to aging and their impermeability is not lessened materially at low temperatures. The principal difficulty encountered in the use of such substances has been to obtain the requisite thickness of protecting material while preserving the necessary flexibility required in a fabric to be made into masks and protective garments, and moreover, they are not water resistant.

The present invention consists in providing a fabric which overcomes these objections and is impermeable to liquid, aerosols and gases. This fabric is made up of successive layers of particular fabrics and particular synthetic resins. The impermeability of the composite fabric obtained is maintained to a large degree after prolonged exposure to inclement weather, water, heat or cold. The fabric is furthermore modified very slowly by poisonous gases, vesicant liquids or suspensions of fine powders in air.

A further object is to provide a fabric which gives the necessary thickness of protective substance while maintaining the high degree of flexibility necessary for the subsequent manufacture of gas masks and protective garments.

A portion of the composite fabric made according to the present invention is shown in section in the figure of the drawing.

Referring to the drawing, $a$ designates an outer fabric or membrane which may itself be made waterproof by any known treatment. A coating $b$ consisting of one or more layers of suitable plasticized synthetic resins are applied next to the outer membrane $a$. The next layer of fabric is a specially prepared intercalary membrane $c$ which is secured to the resin layer $b$. Above the intercalary membrane $c$ is another layer, or a plurality of layers, of synthetic resins $d$. Finally, an outer membrane $e$ is secured to the resin layer $d$.

The fabrics composing the outer membranes $a$ and $e$ may consist of vegetable, animal or synthetic fiber. Fabrics having compact texture have proven preferable. The texture selected will depend largely upon the use to which the composite fabric is to be put.

The synthetic resins forming the layers $b$ and $d$ may be selected from a group including, among others, the following:

Polyvinyl acetates, polystyrols, condensation products of polyvinyl alcohol and aldehydes, and polymerized vinylacetylenes. To these synthetic resins may be added various plasticizers, fireproofing materials, stabilizers and the like.

The nature of the intercalary fabric $c$ is also of great importance. Generally speaking, the fabric selected should be a flexible fabric having an upstanding pile. Examples of such fabrics are brushed or combed cretonnes, cotton balzarine, wool muslin and the like. The network effect on the surface of the fabric may be prepared by brushing, combing or other operations producing the same results.

Since the function of the intercalary fabric is to permit movement between the adjoining layers or synthetic resin, the fabric will be selected in order to give a movable surface, such as one found in ordinary pile fabrics. The pile or loose surface is brushed or otherwise laid in one direction so that when the resin layers are attached the full degree of movement in the opposite direction may be had.

The fabrics $a$, $c$, and $e$ may be replaced by other flexible membranes having the necessary characteristics. The membranes $a$ and $e$ and in some instances, the membrane $c$, may be replaced by paper, cellulose recovered from cellulose xanthate, or cellulose from a solution in ammoniacal copper oxide, by thin metal plates, by leather or the like.

Improved impermeability towards gases, liquids and aerosols may be obtained by using a plurality of intercalary membranes, these membranes being secured together by supplementary layers of synthetic resins.

It is also possible and advantageous to introduce into the intercalary membrane a solid product capable of retaining, absorbing or adsorbing the gases or liquids.

The following is one example of a fabric produced according to the invention:

The outer membrane $a$ is an ordinary percale weighing 125 grams per square meter, waterproofed by treatment with a paraffine emulsion and aluminum triformate.

The synthetic resin layer $b$ is composed of 6 successive layers each weighing 15 to 18 grams per square meter after drying, of the following composition:

| | Grams |
|---|---|
| Polyvinyl acetoformal, prepared for example, according to the instructions of French Patent No. 777,251 of October 20, 1933 | 100 |
| Plasticizer | 100 |
| Denatured ethyl alcohol | 200 |
| Toluene | 200 |
| Methylenechloride | 25 |

These layers are applied on the percale by means of a coating machine.

The intercalary layer $c$ is composed of a cotton balzarine brushed on both sides. This balzarine is secured to the resin layer $b$.

The resin layer $d$ is composed of 6 layers of the same composition as that described for the resin layer $b$, but this resin layer $d$ is applied to:

The outer membrane $e$, of a 20/18 weave calico, rendered impermeable in the same manner as the percale $a$. This calico $e$ together with the resin layer $d$ is placed upon the free side of the cotton balzarine with the resin layer $d$ against the face of the balzarine. The resin and balzarine are then secured together by any suitable means, such as heat or solvents.

The flexible composite fabric obtained has the impermeability attributable to the 12 layers of synthetic resin and yet, by reason of the intercalary membrane, it has sufficient flexibility to enable it to be made into gas masks or protective clothing of various types.

Under normal conditions, a fabric prepared as above described will resist penetration of liquid yperite (mustard gas) for 9 hours, approximately. The fabric further shows good resistance to wrinkling and, finally, it ages but little at a temperature of 50° C. For example, such a fabric aging for 192 hours at 50° C. resists penetration of liquid yperite for about 7 hours.

What is claimed is:

1. A flexible fabric for use in gas masks and protective garments comprising an outer sheet, a layer of synthetic resin on said sheet, said resin being of a type and quantity impermeable and resistant to war gases, aerosols and liquids, a sheet of cloth having an upstanding pile on at least one face attached on one face to said layer of resin, a second layer of synthetic resin attached to the opposite face of said latter sheet, and an opposite outer sheet attached to the said second layer of synthetic resin.

2. A flexible fabric for use in gas masks and protective garments comprising an outer sheet, a layer of a synthetic resin selected from the group consisting of polyvinyl acetate, polystyrols, condensation products of polyvinyl alcohol and aldehydes, and polymerized vinyl acetylenes, said layer being attached to said outer sheet, a second outer sheet, a second layer of said synthetic resin attached to said second outer sheet, and an intercalary fabric with upstanding pile on at least one side attached at opposite sides to each of said layers of synthetic resin.

3. A fabric resistant to the action of war gases, aerosols and liquids which comprises a pile fabric, and layers of resin attached to each side of said fabric, said resin being selected from the group consisting of polyvinyl acetate, polystyrols, condensation products of polyvinyl alcohol and aldehydes, and polymerized vinylacetylene.

4. A fabric resistant to the action of war gases, aerosols and liquids comprising a layer of cloth with a pile structure on both surfaces, a layer of synthetic resin fused to each surface of said cloth, said resin being selected from the group consisting of polyvinyl acetate, polystyrols, condensation products of polyvinyl alcohol and aldehydes, and polymerized vinylacetylenes, said resin layers being continuous and of sufficient quantity of resin to render the fabric impervious and substantially resistant to said war gases, aerosols and liquids, and protective layers of smooth cloth covering the outer surfaces of said resin layers.

5. A fabric according to claim 4 wherein the smooth cloth is waterproofed to protect the underlying resin layers.

6. A fabric resistant to the action of war gases, aerosols and liquids comprising a layer of flexible fabric with brushed opposite faces providing a pile thereon, layers of plasticized polyvinyl acetoformal attached to the opposite faces of said fabric, said polyvinyl aceto-formal layers being continuous and of sufficient quantity of resin to render the fabric impervious and substantially resistant to said war gases, aerosols and liquids, and layers of smooth surfaced fabrics covering the outer faces of said polyvinyl aceto-formal layers.

7. A fabric resistant to the action of war gases, aerosols and liquids comprising a sheet of cloth with a pile structure on at least one side, and a continuous layer of synthetic resin attached to the pile of said cloth in a quantity to render the fabric resistant for a substantial period against war gases, aerosols and liquids, said resin being selected from the group consisting of polyvinyl acetate, polystyrols, condensation products of polyvinyl alcohol and aldehydes, and polymerized vinyl acetylenes.

HENRI GIBELLO.